United States Patent [19]

Sauter

[11] Patent Number: 4,515,393
[45] Date of Patent: May 7, 1985

[54] NEON LIGHTED ROLL BAR

[76] Inventor: Gary E. Sauter, 6957 Wtoming, La Mesa, Calif. 92041

[21] Appl. No.: 493,776

[22] Filed: May 12, 1983

[51] Int. Cl.³ .............................................. B60R 27/00
[52] U.S. Cl. ....................................... 280/756; 248/1; 248/200; 296/102; 362/61; 362/74
[58] Field of Search .................... 280/756, 111, 112 R, 280/689; 296/21, 222, 224, 102; 362/61, 64, 458, 74, 263, 260, 431; 248/536, 539, 534, 1, 200

[56] References Cited

U.S. PATENT DOCUMENTS

| | | | |
|---|---|---|---|
| 3,112,888 | 12/1963 | McKenzie | 362/61 |
| 3,440,415 | 4/1969 | Spiteri | 362/61 |
| 4,171,141 | 10/1979 | Hobrecht | 280/756 |
| 4,192,427 | 3/1980 | Bergman | 362/61 X |
| 4,286,309 | 8/1981 | Rasinski | 362/61 |

FOREIGN PATENT DOCUMENTS 2409076  8/1975  Fed. Rep. of Germany ...... 280/756

Primary Examiner—Joseph F. Peters, Jr.
Assistant Examiner—Mitchell J. Hill
Attorney, Agent, or Firm—Ralph S. Branscomb

[57] ABSTRACT

A roll bar of the type used on motor vehicles, and particularly off-road vehicles, is provided which incorporates a neon light in a central portion of the overhead crossbar, which serves the purpose of producing an illumination which is visible to other vehicles to locate the vehicle, particularly in dense fog.

5 Claims, 5 Drawing Figures

U.S. Patent  May 7, 1985  4,515,393
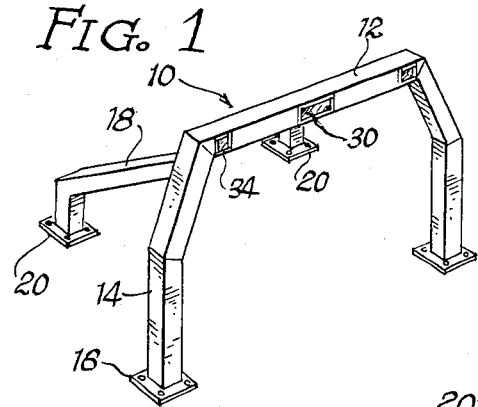
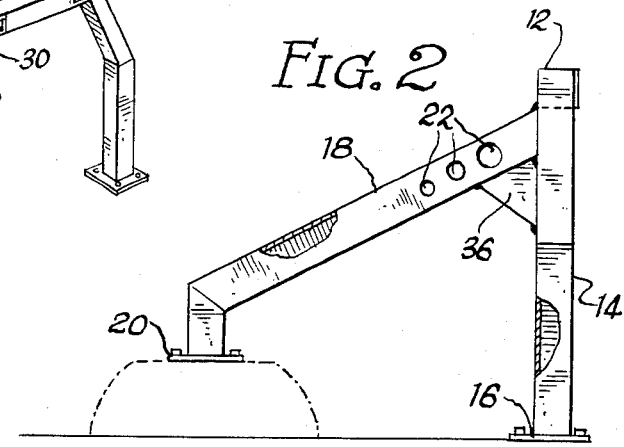
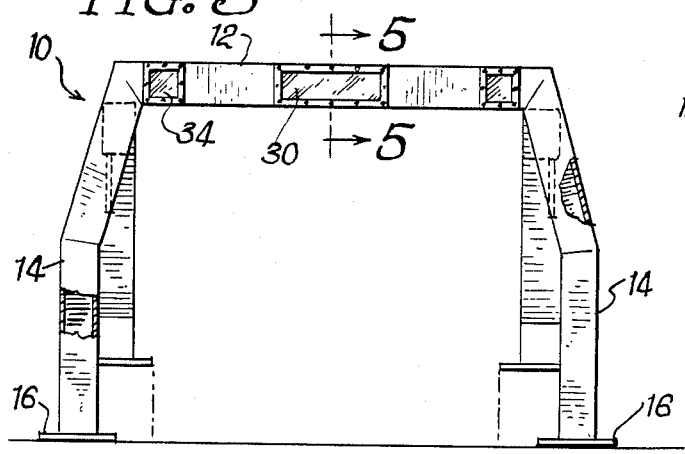
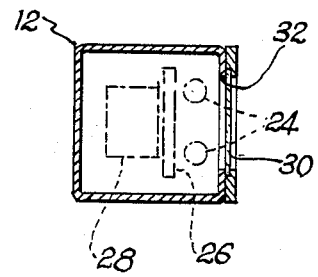
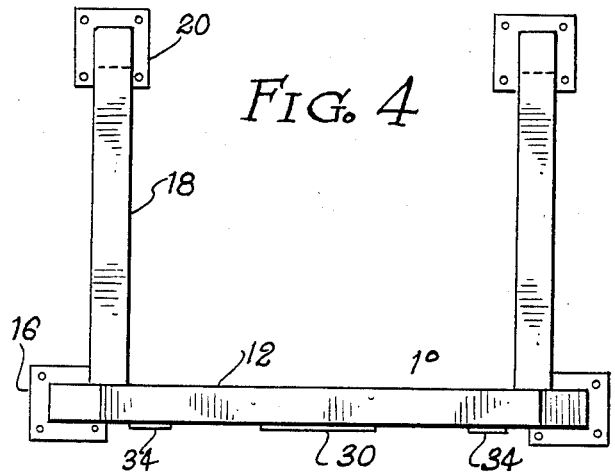

NEON LIGHTED ROLL BAR

BACKGROUND OF THE INVENTION

The invention is in the field of roll bars for motor vehicles, and particularly pertains to illuminated roll bars for off-road vehicles.

When traversing rough terrain in a vehicle such as a Jeep, with four wheel drive which permits operation on steep slopes, it has been found almost essential as a safety precaution to incorporate a roll bar over the cab, especially if the vehicle is open-topped. Because the roll bar is generally the highest anchor point on the vehicle, it is also sometimes used to mount high-illumination headlights, such as quartz lights. From the higher mounting points, the lights illuminate the terrain ahead with less shadowing than with bumper mounted headlights.

Collision between vehicles off road has been a real problem, especially between dunebuggies, and a number of deaths have occurred in such accidents. Despite the fairly widespread use of tall flagged antennae, too often buggies will come flying up the opposite sides of the same hill at 30 or 40 miles per hour and have a head-on collision. Such accidents are inherent in the type of terrain off-roaders prefer, and with the open, un-protected nature of the vehicles themselves.

Although obviously the use of the roll-bar mounted headlights is a lot safer than traveling in the dark, nevertheless the highly directional nature of headlights does not serve to provide a wide angle light beam warning of the approaching vehicle. Also, the white lights of the ordinary headlights tend to blend in with the lights of other vehicle lights, and in the climatic conditions of low clouds or fog, light picked up from nearby cities, campfires, and other sources of illumination render the quartz or other type of headlights inadequate as a means for other vehicles to accurately locate the position and direction of such a vehicle.

There is a need, therefore, for a lighting means on a vehicle, and ideally on the upper portion of a roll bar, which illuminates a wide area for the purpose of locating the vehicle to other drivers. Such a light should ideally come in different frequencies so that a reasonable discrimination between vehicles is possible, and such frequencies should fall in a spectral range suited for penetrating fog and haze.

SUMMARY OF THE INVENTION

The invention fulfills the above-stated needs by incorporating within a roll bar a cavity which houses a neon light which provides a neon glow in one of a variety of selectable colors yielding to each vehicle utilizing such a light a particular signature, differentiating the vehicle from others. The movement of the "aura", or glow, as the vehicle moves about dunes and ravines, clearly indicates both location and direction of the vehicle, and many of the frequencies available in neon are very effective at penetrating fog.

Lastly, the glow of the neon is attractive as a decorative feature and as a novelty, an important feature inasmuch as it is unlikeky that cumbersome, unattractive equipment would be used by hobbyists much despite the safety advantages.

BRIEF DESCRIPTION OF THE DRAWINGS

FIG. 1 is an upper front right perspective view of the roll bar;

FIG. 2 is a right side elevation view with portions cut away;

FIG. 3 is a front elevation veiw of the invention with portions cut away;

FIG. 4 is a top plan view of the invention; and,

FIG. 5—5 is a section taken through line 5—5 of FIG. 3.

DETAILED DESCRIPTION OF THE PREFERRED EMBODIMENT

The roll bar of the instant invention comprises an arched bar 10 made up of a top crossbar 12 and two side side support bars 14 terminating in the depending ends 16 which mount flanged feet to adapt the arched bar member for attachment to the sides of a truck, dune-buggy or the like. The crossbar and side support bars are preferably made of rectangular steel tubing as shown, with the straight lengths being welded to define the illustrated shape.

Rear braces 18 have similar flanged feet 20 for mounting purposes and are welded to the rear of the arched bar 10. These braces preferably have cylindrical bores 22 through them. These bores are actually circular holes cut in the opposite side of the respective portions of the rectangular beam, which are then lined with a cylinder to give the appearance that the supports are solid metal. These holes improve side visibility and reduce wind cross forces on the vehicle.

Preferably centrally mounted on the crossbar and completely recessed within the bar is a neon lighting fixture that lies at the heart of the invention. Although he neon tubing could be provided in a more elaborate shape and pattern, for the purpose of illustration the light is shown as a pair of parallel, horizontal tubes 24 mounted in front of a reflector 26. 28 represents the neon ballast and transformer. The wiring runs through the hollow tubing to the power supply of the vehicle, and is omitted for simplicity.

A tough, transparent faceplate 30 is mounted over the cutaway 32 to protect the delicate neon tubing from flying rocks and brush. This faceplate could be of bullet-proof quality if desired, and the cutaway could be duplicated in the back of the crossbar and similarly covered to provide virtually spherical illumination.

Inasmuch as the neon lights are relatively wide angle and not good at illuminating the path ahead, quartz lights 34 are shown housed in the ends of the crossbar 12. Another feature not yet mentioned is the flange reinforcement construction shown at 36 in FIG. 2.

The roll bar can be made to fit virtually any vehicle that is used off-road, and can be fitted with neon lighting that not only adds a dimension of safety to off-road activities, but also makes possibly a level of decoration and customization of roll bar construction heretofore absent from the off-road industry.

I claim:

1. A roll bar for a motor vehicle comprising:
   (a) An arched bar having depending ends adapted to mount to a motor vehicle and defining a crossbar positioned substantially over said vehicle when said depending ends are mounted thereto;
   (b) A cavity defined in the crossbar portion of said arched bar, and a neon light installed in said cavity and being visible from at least one side of said bar;

(c) said arched bar being generally hollow tubing and said cavity being defined by a cutaway front portion of said crossbar to define a frontally open cavity;
(d) a shatter resistant transparent plate mounted over said cutaway front portion;
(e) said hollow tubing being generally square in cross section and said removed portion comprising a portion of the front side of said tubing;
(f) a pair of rearward braces adapted to mount to rearward portions of said arched bar, said rear braces also being substantially square in cross section; and,
(g) including a plurality of pass-through openings in said braces, said openings being lined with cylinders.

2. A roll bar for a motor vehicle comprising:
(a) An arched bar having depending ends adapted to mount to a motor vehicle and defining a crossbar positioned substantially over said vehicle when said depending ends are mounted thereto;
(b) An opening defined in a forward portion of said crossbar;
(c) A neon light installed within said arched bar in said opening to direct neon light forwardly through said opening and forwardly of said vehicle; and
(d) An impact-resistant transparent shield mounted in said opening such that said arched bar is a totally self-contained protection/illumination bar without external lighting accessories.

3. Structure according to claim 2 wherein said opening is defined in a central uppermost part of said bar to optimize both the distance light from neon light would be visible, and the accuracy with which other vehicles could locate said vehicles in the fog.

4. Structure according to claim 3 wherein said arched bar is square in cross-section and said neon light is defined by two horizontally extended tubes housed in the square crossbar behind said shield.

5. Structure according to claim 3 and including two forwardly directed recessed quartz lights substantially completely housed within said crossbar and maximally laterally spaced along said crossbar and directed to illuminate the terrain in front of the vehicle, such that, whereas said neon lights serve to locate the vehicle for the benefit of other vehicles in the area, said quartz lights illuminate the terrain in front of the vehicle for the benefit of the vehicle driver.

* * * * *